United States Patent [19]

Wells

[11] 4,445,375

[45] May 1, 1984

[54] TUNED CORIOLIS ANGULAR RATE MEASURING DEVICE

[75] Inventor: Robert C. Wells, Endwell, N.Y.

[73] Assignee: General Electric Company, Binghamton, N.Y.

[21] Appl. No.: 239,018

[22] Filed: Feb. 27, 1981

[51] Int. Cl.³ .................. G01C 19/06; G01C 19/28; G01C 19/42

[52] U.S. Cl. ........................... 73/504; 74/5 F; 74/5 R; 74/5.6 D

[58] Field of Search ............... 73/504; 74/5 R, 5 F, 74/5.6 D

[56] References Cited

U.S. PATENT DOCUMENTS

| | | | |
|---|---|---|---|
| 1,801,619 | 4/1931 | Arrea . | |
| 2,291,612 | 8/1942 | Draper | 73/504 |
| 2,716,893 | 9/1955 | Birdsall | 74/5 R |
| 2,964,952 | 12/1960 | Hoover et al. | 74/5.6 D |
| 2,991,659 | 7/1961 | Bowden | 74/5.6 D |
| 3,191,445 | 6/1965 | Eklund | 74/5.6 D |
| 3,290,949 | 12/1966 | Samet | 74/5 F |
| 3,382,726 | 5/1968 | Endley | 74/5.6 D |
| 3,463,016 | 8/1969 | Endley et al. | 74/5.4 |

*Primary Examiner*—James J. Gill
*Attorney, Agent, or Firm*—Arthur E. Bahr; I. David Blumenfeld; Stephen A. Young

[57] ABSTRACT

A tuned coriolis, angular rate measuring device includes a substantially hollow, generally annular rotor driven by a high-speed, synchronous spin motor. The rotor is made unsymmetrical by mounting within the rotor near its periphey at least a pair of high density masses, the respective masses being located diametrically opposite one another. The rotor is secured within a gimbal structure which is, in turn, mounted in tuned fashion upon a support housing through a cantilever spring at each end along the gimbal output axis, thereby providing bearingless, frictionless pivots permitting limited gimbal rotation. A pair of piezo-electric crystals is secured at opposite edges of one of the springs for sensing relative angular motion between the gimbal and the housing. The crystals are electrically paralleled so as to cancel any signals resulting from linear movement between the gimbal and housing.

3 Claims, 5 Drawing Figures

TUNED CORIOLIS ANGULAR RATE MEASURING DEVICE

BACKGROUND OF THE INVENTION

1. Field of the Invention

The present invention relates to angular rate measuring devices–rate gyroscopes, and more particularly, to such an angular rate measuring device having an unsymmetrical rotor producing Coriolis forces, and a gimbal tuned to increase sensitivity to such forces for measuring the angular rate of movement of a vehicle about a given axis.

2. Description of the Prior Art

A conventional, free-mounted gyroscope consisting of a rotor which is caused to spin at high speed upon its axle within a gimbal system providing freedom for rotation about each of two mutually perpendicular axes, each perpendicular to the axis of rotation of the rotor, will be caused to precess solely by reason of movement of the gyroscope in space only if the rotor is perfectly balanced and if each of the respective gimbal axes passes precisely through the center of gravity of the rotor and gimbal system. As a significant rate of precession may be caused by a minute displacement of the rotor axle along its bearings, the inevitable errors in manufacture of conventional designs are sufficient to make the gyroscope wander to an extent which imposes fundamental limits on its use as a navigational instrument, particularly in view of the large and sudden accelerations to which the gyroscope is subjected when it is mounted in an aircraft or missile.

Reduction in steady-state null errors by the use of a vibrating rotor gyroscope was demonstrated in: U.S. Pat. No. 1,801,619 - Arrea, U.S. Pat. No. 3,382,726 - Erdley, and U.s. Pat. No. 3,463,016 - Erdley et al. An unsymmetrical rotor, as shown in U.S. Pat. No. 2,991,659 - Bowden and in U.S. Pat. No. 3,191,445 - Eklund, is capable of producing vibratory signals at twice the rotor frequency. These signals, however, must be separated from spin bearing noise which is considered to be a principal source of error.

In flight-critical systems where multiple redundant components are required, a low-cost gyroscope is essential. Ideally, therefore, simplification of the mechanical configuration of the gyroscope is desirable to achieve a cost saving. However, cost saving must not be achieved at the expense of good null stability, since this error is not predictable and cannot be corrected. Predictable errors such as g-sensitivity, non-linearities, etc. can be compensated for, by the use of electronics.

Accordingly, it is an object of the present invention to produce a mechanically simplified angular rate measuring device–gyroscope.

It is a further object of this invention to produce such a mechanically simplified gyroscope but which lacks the major sources of null instability, including: gimbal imbalance, flotation errors, and steady-state gimbal torques.

SUMMARY OF THE INVENTION

In accordance with the present invention, there is provided an angular rate measuring device which includes a statically and dynamically balanced unsymmetrical rotor including means for spinning the rotor about the central axis thereof at a substantially constant high speed, the central axis thereby serving as the rotor spin axis. A gimbal rotatably secures the unsymmetrical rotor about the central axis thereof. A support base rotatably couples the gimbal about a gimbal axis perpendicular to the rotor spin axis, the gimbal axis being positioned to minimize gimbal inertia and static imbalance. The support base includes flexible means for coupling the gimbal thereto. An input axis perpendicular to the plane of the gimbal axis and the rotor spin axis receives an input angular rate to be measured. Means are provided for sensing relative angular motion between the support base and the gimbal, the relative angular motion being caused by torque being applied about the gimbal axis by Corsiolis forces being generated due to the input angular rate and the linear velocity of the spinning unsymmetrical rotor. The gimbal is tuned about the gimbal axis for increasing sensitivity to the generated Coriolis forces. The sensing means provides an output signal proportional to the input angular rate.

DESCRIPTION OF THE PREFERRED EMBODIMENT

The novel features which are believed to be characteristic of this invention are set forth with particularity in the appended claims. The invention itself, however, both as to its organization and method of operation, together with further objects and advantages, may best be understood by reference to the following description of the preferred embodiment taken in connection with the accompanying drawing.

Figures 1, 3:
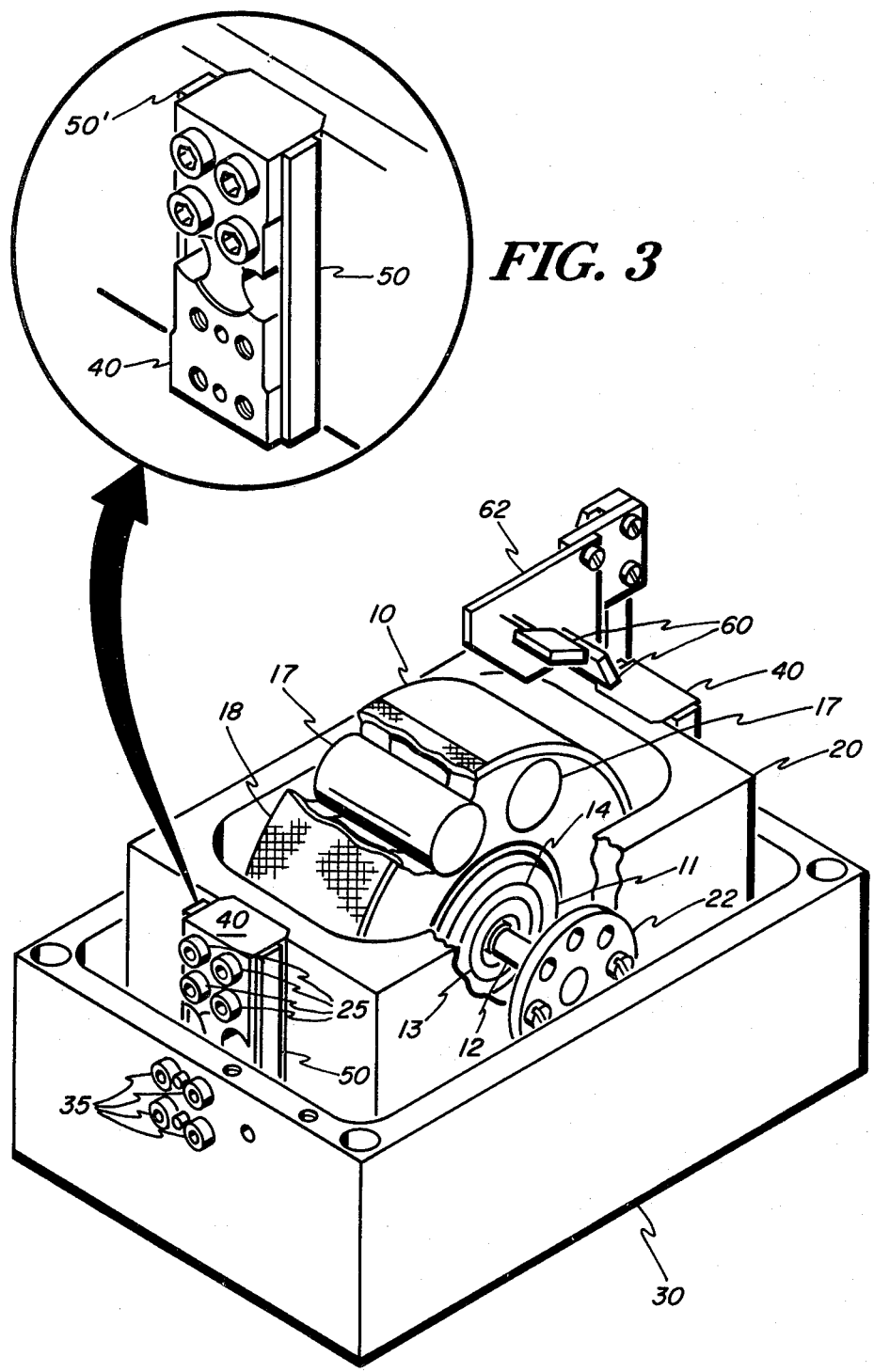
FIG. 1 is a perspective view of the preferred embodiment of the angular rate measuring device of the present invention.
FIG. 3 shows in more detail the flexible coupling of FIG. 1.

Referring now to FIG. 1, there is shown the preferred embodiment of the angular rate measuring device of the present invention. Included is a statically and dynamically balanced unsymmetrical rotor 10, including means such as electrical motor 11 for spinning the rotor about the central axis thereof at a substantially constant high speed. The rotor central axis passes through the center of rotor axle 12 and serves as the rotor spin axis. Electrical motor 11 is of the synchronous, inside-out type and includes a stator 13, having electrical windings and a mounting axle 12, and further including a rotating member 14, having a hysteresis ring, the assembly rotatably secured about the stator 13. Motor 11 is secured within the hub of rotor 10 for maximizing the inertia of the rotor. A gimbal 20 rotatably secures rotor 10, including motor 11, about its central axis, the axle 12 being secured against rotation through locking nuts 22 fastened to the gimbal 20. A support base or housing 30 rotatably couples the gimbal 20 about a gimbal axis perpendicular to the spin axis of the rotor 10, the gimbal axis being positioned so as to minimize gimbal inertia and static imbalance. Flexible means are provided in the form of a pair of gimbal springs 40 for coupling the gimbal 20 to the housing 30. An input axis (FIG. 5) is perpendicular to the plane formed by the gimbal axis and the spin axis and receives an input angular rate to be measured. Means are provided in the form of a pair of piezo-electric crystals 50 and 50' secured to one of the gimbal springs 40 for sensing relative angular motion between the housing 30 and the gimbal 20, the relative angular motion being caused by torque being applied about the gimbal axis by Coriolis forces being generated due to the input angular rate and the linear velocity of the spinning unsymmetrical rotor 10, the gimbal 20 being tuned relative to the housing 30 about the gimbal axis for increasing sensitivity to the generated Coriolis forces. Piezo-electric crystals 50 and 50' provide an output signal proportional to the input angular rate, i.e., they produce an electrical signal in response to relative angular motion between the gimbal and the housing.

Figure 2:
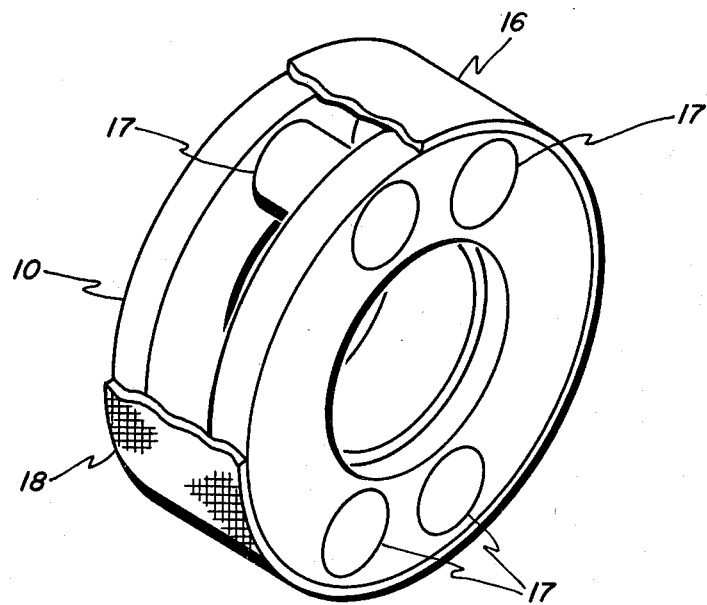
FIG. 2 shows in more detail the construction of the unsymmetrical rotor of FIG. 1.

Referring generally to FIG. 1, and to FIG. 2, reference will be made to further details of the unsymmetrical rotor 10. The rotor 10 is formed in a spool shape thus allowing for the center thereof to be hollow so as to reduce its mass inertia. A thin shrink ring 16 serves to cover the hollow spool, thus creating a generally annular structure for minimizing the effects of windage on the rotor itself and for reducing internal rotor stresses. At least two diametrically opposed, high density masses in the form of solid tungsten cylinders 17 (four in number in the preferred embodiment shown herein) are fixedly secured within the rotor housing as by cementing and serve to maximize Coriolis forces. The rotor assembly 10 is dynamically balanced about its spin axis.

Referring now to FIG. 3, more details may be had of the gimbal springs 40. In this preferred embodiment, the springs 40 are made of aluminum alloy and are in effect cantilever springs which provide bearingless, frictionless pivots for permitting limited gimbal rotation relative to housing 30 about the gimbal axis. The gimbal springs are identical and provide high transmissibility between the gimbal and housing. The springs are selected to tune the resonant frequency of gimbal 20 to approximately twice the frequency equivalent of the spinning rotor. Referring again generally to FIG. 1, it can be seen that each gimbal spring 40 is secured to the gimbal 20 via a set of four machine screws 25 and likewise to the housing through four machine screws 35. Rotation therefore occurs through the narrowed cross section in the center of the gimbal springs 40. Relative angular movement between the housing 30 and the gimbal 20 is transmitted through the gimbal spring and is sensed by the piezo-electric crystals 50 and 50' which are secured by epoxy to the sides of gimbal spring 40. The piezo-electric crystals are thereby essentially hard-mounted between the gimbal 20 and the housing 30. These crystals are electrically in parallel so as to cancel any signals resulting from linear vibration between the gimbal and the housing while passing signals resulting from rotation therebetween.

Figure 4:
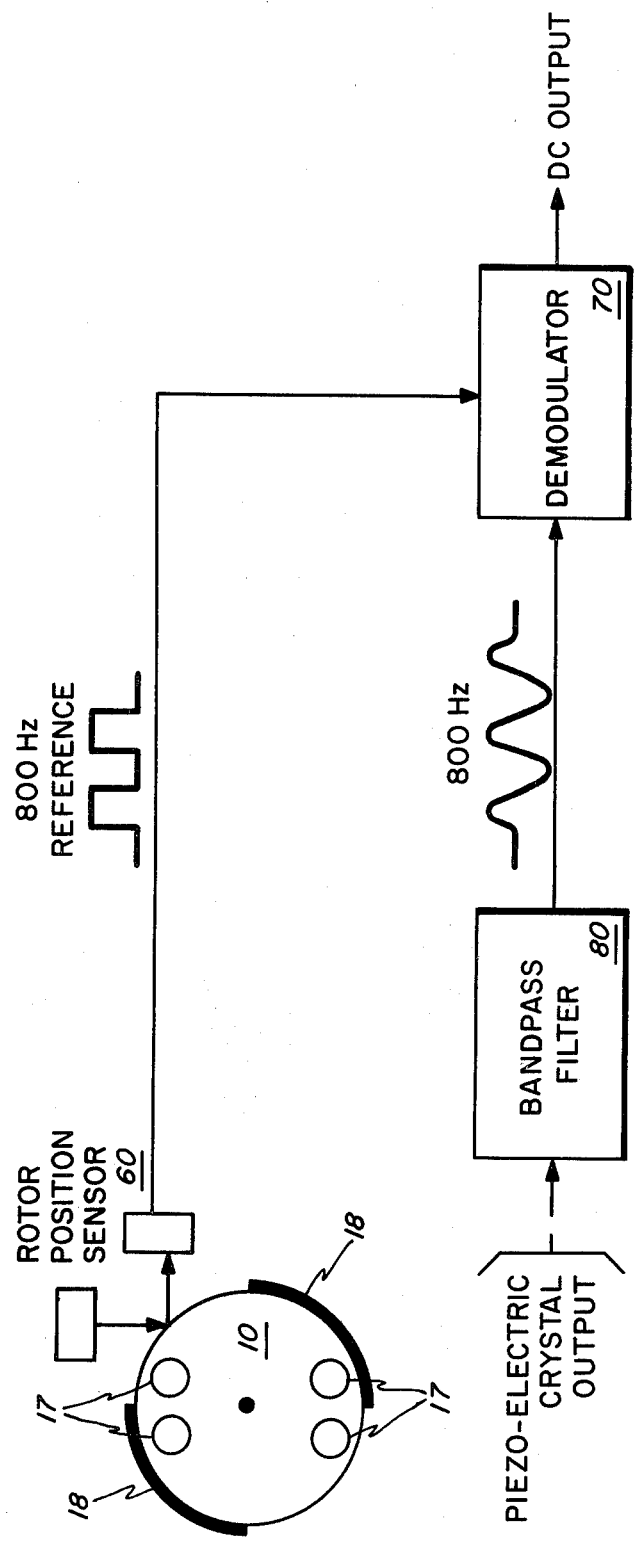
FIG. 4 shows schematically by block representation a circuit useful for processing the output signal generated by the angular rate measuring device of FIG. 1.

Referring again now to FIG. 1, and to FIG. 4, means are also provided for detecting the position of the rotor 10 relative to the housing 30 and for producing a reference signal in response thereto. This rotor angular position detection is provided by a matched emitter-detector pair 60. Both the emitter and the detector are mounted on a printed circuit board 62 so that their sensitive axes converge on the periphery of the rotor as shown in the drawing figures. Two diametrically opposed, absorptive (non-reflective) surfaces 18 on the polished rotor provide interruption for the emitter beam. Each surface (both reflective and absorptive) is one-fourth the rotor circumference in length. A demodulator 70 has as its inputs the output signal from the piezo-electric crystals 50 and 50' and a reference signal produced by the emitter-detector pair 60 and serves to produce a DC electrical output signal proportional to the input angular rate. In practice, a band-pass filter 80 is connected serially between the output of the piezo-electric crystals 50 and 50' and the demodulator 70 for rejecting all frequencies other than that twice the rotor speed: 800 Hz.

Theory of operation of the angular rate measuring device of the present invention will now be discussed with reference to FIG. 5.

Consider a gyroscope rotor spinning at an angular velocity $\omega_s$ about spin axis z. The rotor is made unsymmetrical by a pair of diametrically opposed, high-density masses m at radius R. These masses have a linear velocity $$v = \omega_s R.$$

The rotor is mounted in a gimbal which is pivoted along gimbal axis x by a torsional spring of constant k lbs/in. an input angular rate $\omega$ is applied about input axis y.

Figure 5:
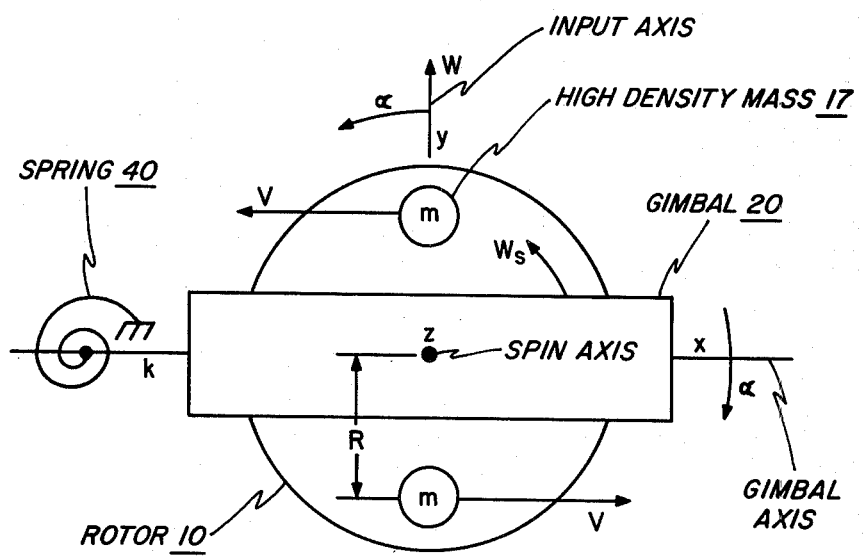
FIG. 5 shows schematically the theory of operation of the angular rate measuring device of the present invention.

We consider first the high-density masses m. A Coriolis force $$F_c = 2m\bar{\omega} X \bar{v} \text{(for each mass)}$$

is applied to the gimbal in a direction perpendicular to the plane of FIG. 5 having a magnitude, for the orientation of FIG. 5, of:

$$F_c = 2m\omega v \text{(for each mass)}.$$

The gimbal torque $T_c$ due to Coriolis forces is:

$$T_c = 2F_c R = 4m\omega v R.$$

For a rotor position 90° from that shown in FIG. 5, the Coriolis force is zero since $\omega$ and v are parallel and the effective torque arm is zero. The general expression for the Coriolis gimbal torque $T_c$ about the gimbal axis as a function of rotor angle $\alpha$ (FIG. 5) is:

$$T_c = 2 F_c \cos\alpha R \cos\alpha$$
$$= F_c R(\cos 2\alpha + 1).$$

But, $$\alpha = \omega_s t$$

where t is time. Then, $$T_c = F_c R + F_c R \cos 2\omega_s t.$$

Thus, the masses m produce a steady-state and cyclic component. But, $$F_c R = 2 m\omega v R$$
$$= I_m \omega_s \omega$$
$$= H_m \omega$$

where:

$v = \omega_s R$ $I_m =$ inertia of masses $m = 2m R^2$ and $H_m =$ angular momentum of masses $m = I_m \omega_s$.

therefore:

$T_c = (H_m + H_m \cos 2\omega_s t)\omega$.

An additional torque $T_R$ results from the rotor without the masses $m$:

$I_R = I_R \omega_s \omega$ $= H_R \omega$ where
 $I_R =$ rotor inertia (minus masses m)
 $H_R =$ rotor angular momentum (minus masses m)
and $H_R = I_R \omega_s$.

The total gimbal torque $T_T$ is therefore:
$T_T = T_R + T_c = (H_R + H_m + H_m \cos 2\omega_s t)\omega$.

But, since total gimbal angular momentum $H_T = H_m + H_R$, $T_T = (H_T + H_m \cos 2\omega_s t)\omega$.

Thus, the total torque is equal to the sum of a steady-state torque and a cyclic torque (Coriolis torque) occurring at twice rotor frequency.

Tuning the gimbal to this frequency, the output angle $\alpha$ is a maximum for the Coriolis torque component. For this condition, the gimbal spring $K4 = I_G \omega_s^2$, where
 $I_G =$ gimbal inertia at $\omega_s$.
This inertia at spin speed $\omega_s$ will be different from the measured inertia at $\omega_s = 0$. It can be shown that:

$I_G = I_{GO} + (H_T^2/ky)$ where
 $I_{GO} =$ gimbal inertia $\omega_s = 0$
 $ky =$ spring rate of rotor about y axis.

The angular momentum $H_T$ has the effect of increasing the apparent gimbal inertia and reducing gimbal resonant frequency. This effect is more evident as cross-axis gimbal stiffness is reduced.

An angular rate measuring device, a rate gyroscope, as shown in the drawing figures, has operated satisfactorily having the following listed parameters.

| Rotor Assembly | |
|---|---|
| Total Weight | .1156 lbs |
| Rotating Weight | .1046 lbs |
| Inertia about Spin Axis | 6.24 × 10$^{-5}$ in lb sec$^2$ |
| Inertia about Output Axis | 5.85 × 10$^{-5}$ in lb sec$^2$ |
| Nominal rotational speed | 24000 RPM |
| Ratio, counter weight inertia to total inertia | .6208 |
| *-continued* | |
| Mass Imbalance | 9 μin |
| Torque Imbalance | 1 μin |
| Gimbal Assembly | |
| Maximum inertia about Output Axis | 8.467 in lb sec$^2$ |
| Gimbal Weight | .0464 lbs |
| Natural frequency* | |
| (Max rotor inertia) | 821 Hz. |
| (Min rotor inertia) | 1069 Hz. |
| Gimbal spring stiffness | 1530 in lbs/rad. |

*The natural frequency of the gimbal assembly varies with position of the asymmetrical rotor.

The rotor was constructed of aluminum alloy as were the gimbal and the housing. The cantilever gimbal springs were also formed of aluminum alloy, each being approximately 0.75×0.30×0.15 inches. The piezo-electric crystals were approximately 0.75×0.09×0.02 inches. The matched emitter-detector pair is commercially available as GE H23B1.

While an angular rate measuring device has been described in what is presently considered to be a preferred embodiment of the invention, it will be apparent to those skilled in the art that various changes and modifications may be made in the structure and the instrumemtality utilized without departing from the true spirit and scope of the invention. As an example, the cantilever gimbal springs might be constructed of a more stable material, such as INVAR, ELINVAR, NI-SPAN-C, or ISO-ELASTIC; or other nickel-iron alloys having a constant modulus of elasticity. A capacitance or electro-magnetic pickoff might be used in place of the piezo-electric crystals. And a magnetic-type sensor, such as a magnetic square-wave generator, or a capacitive sensor might be used instead of the emitter-detector pair.

What is claimed is:

1. An angular rate measuring device comprising:
 (a) a statically and dynamically balanced, unsymmetrical rotor including means for spinning the rotor about the central axis thereof at a substantially constant high speed, the central axis thereby serving as the rotor spin axis;
 (b) a gimbal rotatably securing the unsymmetrical rotor about the central axis thereof;
 (c) a support base for rotatably coupling the gimbal about a gimbal axis perpendicular to the spin axis of the rotor, the gimbal axis being positioned to minimize gimbal inertia and static imbalance, the base including flexible means for coupling the gimbal to the base;
 (d) an input axis perpendicular to the plane of the gimbal axis and the spin axis for receiving an input angular rate to be measured; and
 (e) means for sensing relative angular motion between the support base and gimbal, the relative angular motion being caused by torque being applied about the gimbal axis by oscillatory Coriolis forces being generated due to the input angular rate and the linear velocity of the spinnin gunsymmetrical rotor, the gimbal being tuned about the gimbal axis for increasing sensitivity to the generated Coriolis forces, the sensing means providing an output signal proportional to input angular rate, the means for sensing relative angular motion including a pair of piezo-electric crystals secured to the flexible coupling means at opposite sides thereof such that in the presence of relative angular motion between the gimbal and the support base, a first crystal will be in tension and a second crystal will be in compression, the outputs of the respective crystals being electrically connected in parallel for minimizing the effects of relative linear motion between the gimbal and the support base.

2. A rate gyroscope comprising:
(a) a gimbal structure;
(b) a statically and dynamically balanced rotor rotatably secured within the gimbal structure, the rotor including an electric motor for spinning the rotor at synchronous high speed, the motor being of the inside-out type including a stator having electrical windings fixedly secured to a central shaft in turn fixedly secured to the gimbal, the motor further having a rotating member including a hysteresis ring rotatably secured about the stator; the rotor further including a hollow, generally annular structure fixedly secured about the periphery of the motor rotating member and at least two, high-density masses secured within the annular structure at opposite ends of a diameter perpendicular to the motor stator central shaft, the rotor having a spin axis concentric with the central axis of the shaft;
(c) a support housing including means for flexibly coupling the gimbal to the housing about a gimbal axis perpendicular to the rotor spin axis through the rotor center, the gimbal axis being positioned for minimizing gimbal inertia and static imbalance; the gimbal being tuned about the gimbal axis through the coupling means to approximately twice the frequency of the spinning rotor for increasing sensitivity to Coriolis forces;
(d) an input axis perpendicular to the plane of the gimbal axis and the spin axis for receiving an input angular rate to be measured;
(e) means for sensing relative angular motion between the gimbal and the support housing being caused by torque being applied to the gimbal about the gimbal axis by Coriolis forces being generated due to the input angular rate and the linear velocity of the spinning rotor, the sensing means providing an output signal proportional to input angular rate, the means for sensing relative angular motion including a pair of piezo-electric crystals respectively fixedly secured between the gimbal and the support housing for producing an electrical signal in response to relative angular motion between the gimbal and the support housing, the crystals being located such that in the presence of the relative angular motion between the gimbal and the support housing one crystal is in compression, and the other crystal is in tension, the outputs of the respective crystals being electrically connected in parallel for minimizing the effects of relative linear motion between the gimbal and the support base;
(f) means for detecting rotor position relative to the support housing and for producing a reference signal in response thereto; and
(g) a demodulator having as inputs the output signal from the sensing means and the reference signal, the demodulator serving to produce a DC electrical output signal proportional to the input angular rate.

3. An angular rate measuring device, comprising:
(a) a statically and dynamically balanced rotor, the rotor including an axle and at least two equal, high-density masses rotatably secured to the axle at opposite ends of a diameter perpendicular to the axle;
(b) means for spinning the rotor about the axle at a substantially constant high speed;
(c) a gimbal rotatably securing the rotor through the opposite ends of the axle, the spin axis of the rotor being concentric with the central axis of the axle;
(d) a support housing including flexible means for rotatably coupling the gimbal about a gimbal axis perpendicular to the rotor spin axis through the center of the rotor, the gimbal axis being positioned to minimize gimbal inertia and static imbalance;
(e) an input axis perpendicular to the plane of the gimbal axis and the spin axis for receiving an input angular rate to be measured; and
(f) means for sensing relative angular motion between the support housing and the gimbal, the relative angular motion being caused by torque being applied about the gimbal axis by Coriolis forces being generated due to the input angular rate and the linear velocity of the spinning rotor, the gimbal being tuned about the gimbal axis for increasing sensitivity to the generated Coriolis forces, the sensing means providing an output signal proportional to input angular rate, the means for sensing relative angular motion including a pair of piezoelectric crystals secured to the flexible coupling means at opposite sides thereof such that in the presence of relative angular motion between the gimbal and the support base, a first crystal will be in tension and a second crystal will be in compression, the outputs of the respective crystals being electrically connected in parallel for minimizing the effects of relative linear motion between the gimbal and the support base.

* * * * *